(12) United States Patent
Evans et al.

(10) Patent No.: US 7,464,096 B2
(45) Date of Patent: *Dec. 9, 2008

(54) METHOD AND APPARATUS FOR INFORMATION MINING AND FILTERING

(75) Inventors: David A. Evans, Pittsburgh, PA (US); Michael L. Horowitz, Pittsburgh, PA (US); Christopher C. Lichti, Pittsburgh, PA (US); Thomas P. Neuendorffer, Wexford, PA (US)

(73) Assignee: JustSystems Evans Reasearch, Inc., Pittsburgh, PA (US)

( * ) Notice: Subject to any disclaimer, the term of this patent is extended or adjusted under 35 U.S.C. 154(b) by 90 days.

This patent is subject to a terminal disclaimer.

(21) Appl. No.: 11/147,540

(22) Filed: Jun. 8, 2005

(65) Prior Publication Data

US 2005/0223042 A1    Oct. 6, 2005

Related U.S. Application Data

(63) Continuation of application No. 09/544,121, filed on Apr. 6, 2000, now Pat. No. 6,915,308.

(51) Int. Cl.
G06F 17/30 (2006.01)
G06F 17/00 (2006.01)

(52) U.S. Cl. ............................. 707/100; 707/1; 707/10; 707/101; 707/200

(58) Field of Classification Search ...... 707/100–104.1, 707/1, 10, 200; 345/854, 855; 715/500, 715/512–513, 500.01, 503
See application file for complete search history.

(56) References Cited

U.S. PATENT DOCUMENTS

| | | | |
|---|---|---|---|
| 5,732,216 A * | 3/1998 | Logan et al. ................. | 709/203 |
| 5,806,062 A | 9/1998 | Chen et al. | |
| 5,841,437 A | 11/1998 | Fishkin et al. | |
| 5,911,138 A | 6/1999 | Li et al. | |
| 5,915,249 A | 6/1999 | Spencer | |
| 5,999,940 A | 12/1999 | Ranger | |
| 6,026,388 A * | 2/2000 | Liddy et al. ................. | 707/1 |

(Continued)

OTHER PUBLICATIONS

"Visual Query and Analysis Tool of the Object-Relational GIS Framework"- Zoran Stojanovic, Slobodanka Djordjevic-Kajan and Dragan Stojannovic—CIKM 2000 ACM (pp. 328-335).*

(Continued)

*Primary Examiner*—Jean Bolte Fleurantin
*Assistant Examiner*—Anh Ly
(74) *Attorney, Agent, or Firm*—Jones Day; Blaney Harper

(57) ABSTRACT

A method and system for computer-assisted analysis of information from a data source employs operators including search terms and filters. A visual representation of a network of operators is generated, the operators being user selectable and linked to form the network, which is configured to analyze information from a selectable data source. The network of operators can be compiled as a unit. If the data source includes a database, the operators are applied to the database, and if the data source includes a data stream, a data unit of the data stream is evaluated with the operators. An output indicator corresponding to each of the operators is generated on the visual representation of the network, wherein the output indicator visually represents a quantified output of a corresponding operator. A further output corresponding to one or more of the output indicators is also generated.

17 Claims, 11 Drawing Sheets

U.S. PATENT DOCUMENTS

| | | | |
|---|---|---|---|
| 6,029,171 | A | 2/2000 | Smiga et al. |
| 6,104,395 | A * | 8/2000 | Alimpich et al. ............. 715/781 |
| 6,182,119 | B1 | 1/2001 | Chu |
| 6,208,985 | B1 | 3/2001 | Krehel |
| 6,243,713 | B1 * | 6/2001 | Nelson et al. ............. 707/104.1 |
| 6,266,053 | B1 | 7/2001 | French et al. |
| 6,295,527 | B1 * | 9/2001 | McCormack et al. ........... 707/3 |
| 6,301,584 | B1 * | 10/2001 | Ranger .................... 707/103 R |
| 6,353,825 | B1 * | 3/2002 | Ponte ............................ 707/5 |
| 6,363,353 | B1 | 3/2002 | Chen |
| 6,363,384 | B1 * | 3/2002 | Cookmeyer et al. ........... 707/10 |
| 6,396,517 | B1 * | 5/2002 | Beck et al. .................. 715/771 |
| 6,411,924 | B1 | 6/2002 | de Hita et al. |
| 6,418,428 | B1 | 7/2002 | Bosch et al. |
| 6,434,556 | B1 | 8/2002 | Levin et al. |
| 6,466,211 | B1 | 10/2002 | Havre et al. |
| 6,662,195 | B1 * | 12/2003 | Langseth et al. ............. 707/200 |
| 6,691,151 | B1 * | 2/2004 | Cheyer et al. ........ 707/E17.071 |
| 6,694,316 | B1 * | 2/2004 | Langseth et al. .............. 707/10 |
| 6,768,997 | B2 * | 7/2004 | Schirmer et al. ............ 707/102 |
| 6,915,308 | B1 | 7/2005 | Evans et al. |
| 2001/0049695 | A1 * | 12/2001 | Chi et al. .................... 707/201 |
| 2002/0029350 | A1 * | 3/2002 | Cooper et al. .................. 705/1 |
| 2002/0052875 | A1 * | 5/2002 | Smith et al. ................... 707/10 |
| 2002/0059297 | A1 * | 5/2002 | Schirmer et al. ......... 707/104.1 |
| 2002/0103809 | A1 * | 8/2002 | Starzl et al. ................. 707/102 |

OTHER PUBLICATIONS

"Image Processing on Compressed Data for Large Video Databases"—Farshid Arman, Arding Hsu, and Ming-Yee Chiu, Siemens Corporate Research, Inc.—International Multimedia Conference—1993—ACM (pp. 267-272).*

* cited by examiner

```
\*
# 1
\#
BW report #22:
\#
\!
-1 (pa view)  () T
-1 (is)  () V
-1 (compared)  () V
-1 (to)  () P
-1 (previous examination)  () T
-1 (dated)  () V
-1 (10 22 91)  () X
\$
-1 (surgical clip)  () T
-1 (are)  () V
-1 (again)  () A
-1 (seen)  () V
-1 (along)  () P
-1 (right mediastinum)  () T
-1 (and)  () C
-1 (right hilar region)  () T
\$
-1 (are)  () V
-1 (new surgical clip)  () T
-1 (in)  () P
-1 (distribution)  () T
-1 (of)  () P
-1 (circumflex artery)  () T
-1 (as well as)  () C
-1 (4 intact sternotomy wire)  () T
\$
-1 (is)  () V
-1 (persistent increased right paramediastinal opacity)  () T
-1 (possibly)  () A
-1 (related)  () V
-1 (to)  () P
-1 (previous radiation therapy)  () T
\$
-1 (new plate like opacity)  () T
-1 (are)  () V
-1 (seen)  () V
```

Fig. 6

METHOD AND APPARATUS FOR INFORMATION MINING AND FILTERING

CROSS REFERENCE TO RELATED APPLICATION

This is a continuation of application Ser. No. 09/544,121, filed Apr. 6, 2000 now U.S. Pat. No. 6,915,306.

FIELD OF THE INVENTION

The present invention relates to the field of computerized systems for filtering, refining and analyzing information. More particularly, this invention relates to a method and apparatus for filtering, refining and analyzing information through a graphical user interface.

BACKGROUND OF THE INVENTION

Advances in electronic storage technology have resulted in the creation of vast databases of documents stored in electronic form. These databases can be accessed from remote locations around the world. As a result, vast amounts of information are available to a wide variety of individuals. Moreover, information is not only stored in electronic form but it is created and disseminated throughout the world in electronic form. Sources for the electronic creation of such information includes news, periodicals, as well as radio, telephony, television and Internet services. All of this information is made available to the world through a variety of computer networks, such as the worldwide web, on a real time basis. The problem with this proliferation of electronic information, however, is that it is difficult for any one individual to extract information useful to that individual in a timely manner—that is, how does an individual mine the databases and filter the streams of incoming data?

Conventional programs for finding, filtering, classifying or extracting information typically operate to perform only one operation. For example, a program may be structured such that a user identifies some logical combination of words and then the program identifies documents (or other information) in selected databases that contain a similar logical combination of words. Another program may operate to extract documents containing specific types of entities. However, the programs that perform entity extraction are generally incompatible with the programs that extract logical word combinations. Moreover, while both the entity and logical word extraction programs operate on databases, neither are structured to operate on data streams. The problems of these types of conventional programs arise from the fact that they are based on a computer program model in which a defined input is processed to produce a defined output. This conventional programming model assumes the user has a substantial familiarity with the individual program as well as the characteristics of the data being analyzed. Furthermore, because of the static nature of the conventional model (i.e., a single set of output data, such as a document list, is generated for each input request), users are left to determine for themselves the relationships among the data being analyzed and the input parameters on which the information analysis is based.

To overcome the problems inherent in conventional search, analysis and filtering techniques, a new type of information analysis technique must be developed in which the user may discover various characteristics of the information contained in a database or stream of data. This new technique, then, may allow a user to represent and interrelate in an arbitrary way the characteristics that have been discovered. Such a new information analysis tool must enable manipulation of the input parameters and multiple output datasets in such a way as to demonstrate how various database characteristics interrelate. This new information analysis tool must further demonstrate how individual pieces of information in an input data stream pass through various analysis stages and provide feedback for dynamic adjustment of the analysis stages.

OBJECTS OF THE INVENTION

It is an object of the present invention to provide a method and apparatus to effect improved information analysis from a variety of data sources.

It is still a further object of the present invention to provide a method and apparatus to perform a variety of information analysis functions including retrieving documents from a database, extraction of typed information, discovery of database characteristics or filtering information from a data stream.

It is another object of the present invention to provide a graphical user interface to a computer system for performing information analysis functions including retrieving documents from a database, extraction of typed information, discovery of database characteristics or filtering information from a data stream.

It is still another object of the present invention to provide a graphical user interface to a computer system for performing information analysis operations in which selected sources of information are graphically linked with selected analytical functions and wherein those selected analytical functions operate on the selected sources of information.

It is still a further object of the present invention to provide a graphical user interface to a computer system for performing information analysis operations in which combinations of selected analytical functions may be graphically linked to various data sources.

It is still another object of the present invention to provide a graphical user interface to a computer system for performing information analysis operations in which the results of the operations are graphically presented in relation to the operation on a real time basis.

It is still a further object of the present invention to make the results of the information analysis operations available to other information handling operations, programs or systems which can, in turn, quantify, evaluate, respond or act on the results provided.

SUMMARY OF THE INVENTION

The present invention combines a data processing structure with a graphical user interface (GUI) to create an information analysis tool wherein multiple functions are combined in a network to analyze information from multiple data sources. The functional network is created, and graphically represented to the user, by linking individual operations together. The combination of individual operations is not limited by the input or output characteristic of any single operation. The form of the input to or output from any individual operation, whether from a database or from another operation, is the same. That is, both the input to and the output from an analysis function is a list of document identifiers and corresponding document characteristics. Because the form of the input and output from each operation is the same, arbitrary combinations of operations may be created. Moreover, functional networks of individual operations can then be used for database retrieval as well as to filter data streams. Furthermore, the user is able to create a visual representation of the structure forming a functional network which may be dynamically updated as new data is added or functions switched in or out. Because, inter alia, the network structure dynamically responds to information as it is presented to the network, the visual representation of the network conveniently provides the user with information concerning the characteristics of the database or stream of data that are substantially unavailable through conventional search, filtering, or clustering techniques alone.

BRIEF DESCRIPTION OF THE DRAWINGS

The invention will be described in detail with reference to the following drawings:

FIG. 6 is a listing of parsed text from a document according to one embodiment of the present invention.

DETAILED DESCRIPTION OF THE INVENTION

Figure 1:
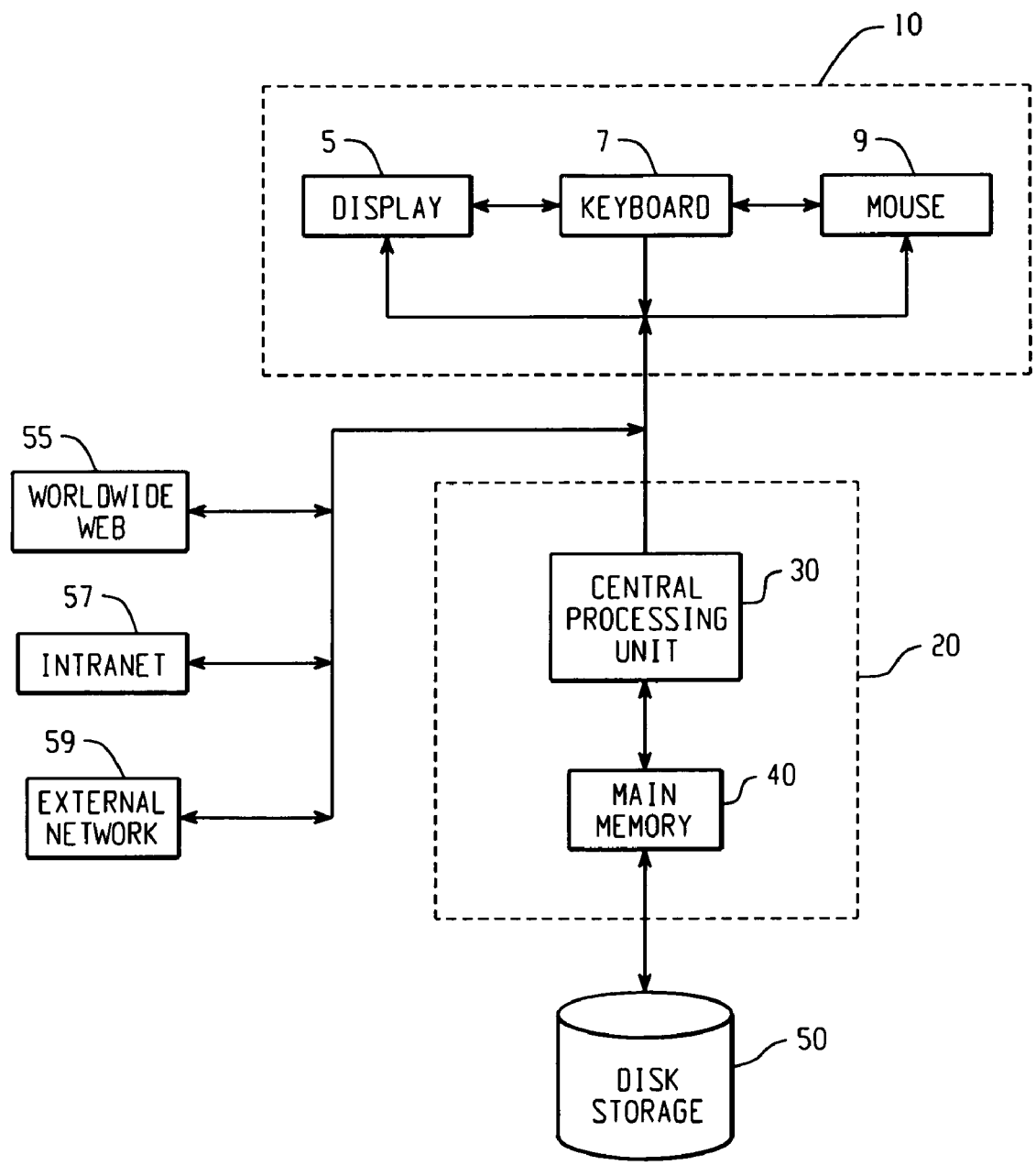
FIG. 1 is a block diagram that illustrates a computer system for performing information analysis operations according to one embodiment of the present invention.

FIG. 1 is a block diagram of a computer system used for retrieving information from a database. Computer 20 comprises a central processing unit (CPU) 30 and main memory 40. Computer 20 is connected to an Input/Output (I/O) system 10 and disk storage unit 50. The I/O system 10 includes a display 5, a keyboard 7 and a mouse 9. Furthermore, this computer system is connected to a variety of networks for communicating with other computers and obtaining access to remote databases. Among the networks connected to this computer system is the worldwide web 55, an intranet 57, private external network 59. In general, the disk storage unit 50 stores the program for operating the computer system and it stores the documents of the database. The computer 20 interacts with the I/O system 10 and the disk storage unit 50. The computer 20 executes operations according to instructions contained in a program that is retrieved from the disk storage unit 50. This program causes the computer 20 to retrieve the text of documents, or parts thereof, which are stored in a database located either in disk storage 50 or in a storage location accessible over a network. These instructions also cause information received over a network to be distributed to specific individuals over a network based on the content of the information.

The architecture of the program that implements the information analysis tool of the present invention essentially comprises four components: (i) an input component, ii) an analytical process component, iii) an output component and iv) an action/response component. The input component comprises a graphical user interface "GUI" to visually represent the relationship between various sources of data input and combinations of various operators used to create analytical functions. The visualization of the dynamic relationship between the input and the operators, as this relationship is changed by the user, provides significant feedback to the user for use in creating analytical functions. The analytical process component comprises processing steps that automatically recognize the form of the selected input data sources and associate with those sources the processing resources that permit the computer system to efficiently process operators on the selected input sources. The output component, as in the input component, comprises a GUI that visually represents the status of the analytical function as data sources are being processed. Finally, the action/response component comprises steps for automatically taking an action or creating a response based on the output from the analytical function.

Figure 2:
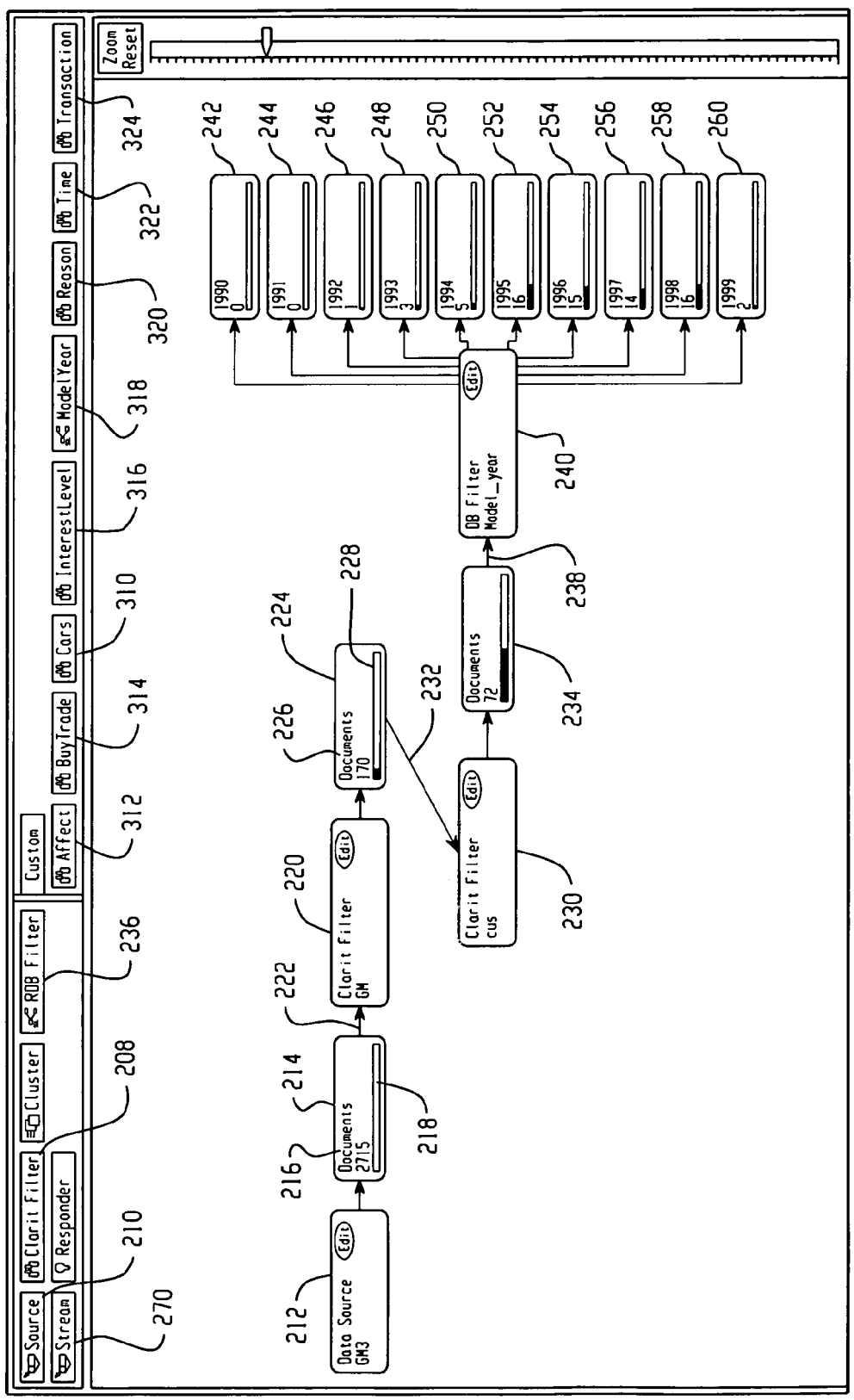
FIG. 2 illustrates an example of the structure of a complete information analysis operation constructed with a graphical user interface according to one embodiment of the present invention.

FIG. 2 illustrates the structure of a complete search operation of a specific database constructed according to the program for operating the computer system of the present invention. FIG. 2 illustrates the GUI incorporated into the input component of the program discussed above which allows a user to link the sources of information to analysis operators that a user may desire. The program is structured so that any data source may be linked to any analysis operation. In this way, the user may create a network to analyze information. In particular, the program operates according to a conventional "drag and drop" GLUI. As illustrated in FIG. 2, the GUI includes a data source selection button. Moving a cursor to click-on (i.e., select) a data source 210 displays a list of data sources. These data sources can be databases of documentary information or streams of information. The data sources (whether streams or databases) can contain information relevant to any topic and these data sources can consist of a variety of forms such as audio (including telephony), video, pictures, graphics or text files or any combination thereof.

Figure 3:
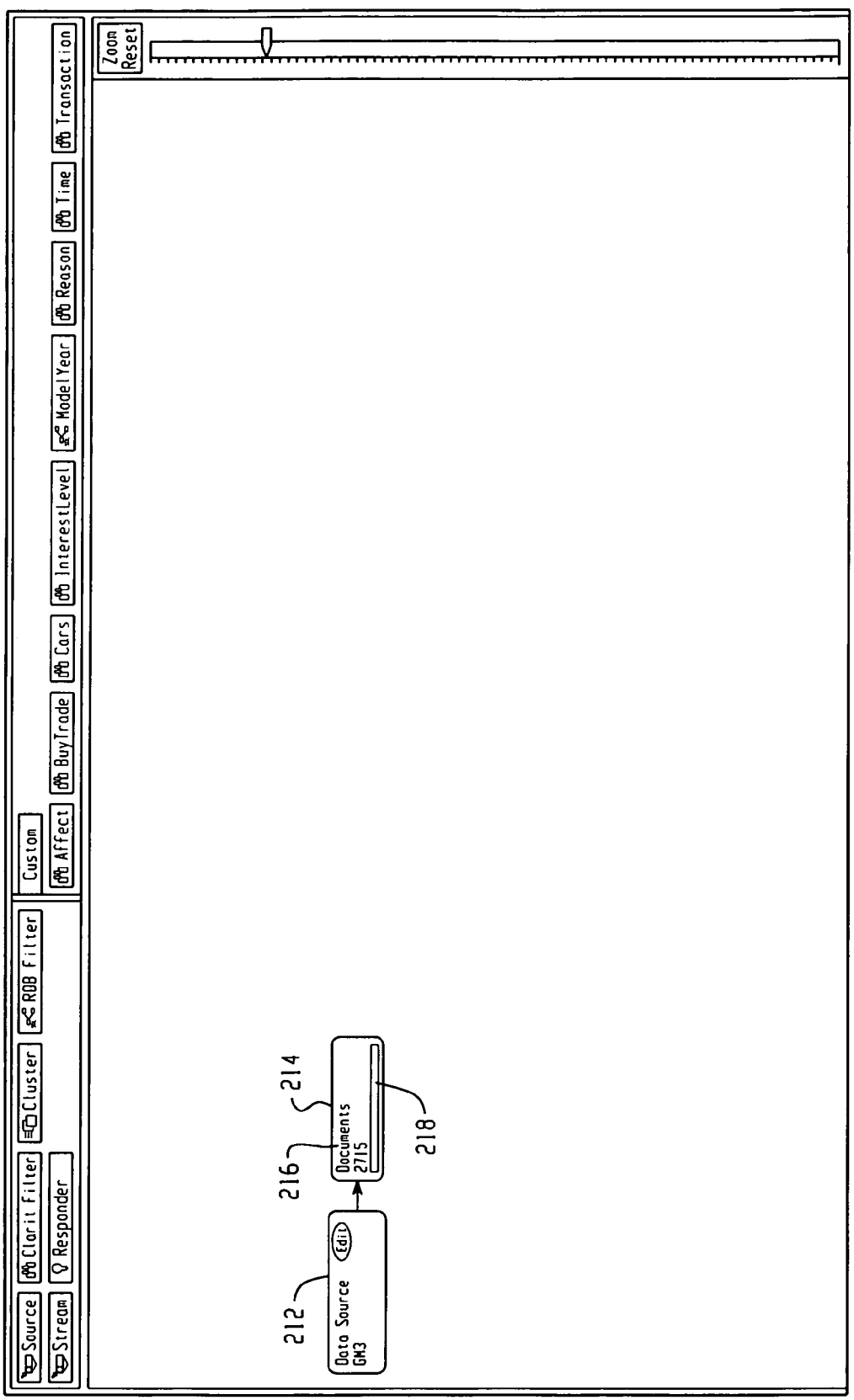
FIG. 3 illustrates an example of a structure of a partial information analysis operation constructed with a graphical user interface according to one embodiment of the present invention.

In the particular example shown in FIG. 2, the database 212 has been selected. Dragging and dropping database 212 onto the GUI palette automatically displays a dialog box 214 associated with the selected database. FIG. 3 illustrates the palette after this initial drag and drop operation. The dialog box 214 provides a text description 216 of a global characteristic of the source, such as the number of documents in the source. This text description 216 could also be a number of other such global parameters, including without limitation, the number of words, bytes or subdocuments or a list of types of information in the databases. Additionally, the dialog box also contains a graphic depiction 218 for the global parameter. Here the graphic 218 is a bar chart but could also be a number of other similar graphic entities such as a pie chart needle gauge or term map (e.g., graphic representation of document terms appearing in documents). The purpose of the dialog box is to quickly and conveniently provide the user of the GUI with a quantitative measure of the source database. As described more fully below, this quantitative measure is tracked through the construction of an analysis network (i.e., analytical function) to provide the user a context in which to evaluate information.

As noted above, a data source can be a variety of types. One type of database, for example, is a relational database (RDB) in which a series of individual documents, each of which is identified by an identification number, have a series of fields (e.g., date, time, author, abstract) and a text (or characters or graphics treated as text) associated with each field. Another type of database is simply a textual database in which a series of individual documents, each of which is identified by an identification number, is associated with a single text field. The data within this text database can be heterogeneous records or documents including structured, semi-structured or unstructured text. As those in the art readily recognize, a large variety of types of databases can be created by combining aspects of RDBs, text databases, audio and video files and graphics and pictures. Moreover, as discussed more fully below the data source can be a data stream in which heterogeneous records or documents including structured, semi-structured or unstructured text is periodically presented to the program for routing or other responsive action.

The database 212 shown in FIG. 2 is not strictly either an RDB or a text database. The database 212 consists of a series of individual documents each of which has an identifying number associated with a text field. As part of the analytical process section of the program architecture discussed above, the set of documents that make up the database 212 has been processed so as to make searching large numbers of such documents faster and more efficient. In particular, when a user selects a database, the program of which the GUI is a part detects the characteristics of the database and associates necessary resources with that database. For example, if a database is of the RDB type, various processing of that database may have already been performed, such as, extraction of all surnames, dates or state names. The analytical processing section of the program automatically retrieves those resources when the RDB database is selected. Other types of resources that may be associated with various types of individual databases include, but are not limited to, terms, lexicons (e.g., for different languages, slang, thesauri, etc.), natural language grammar rules, punctuation codes, term distribution counts, term counts, discourse markers, feature counts, reference data from associated databases (e.g., AP news stories over last 20 years) or typed semantic markers that may have been discovered by additional processing of the documents.

Figure 5:
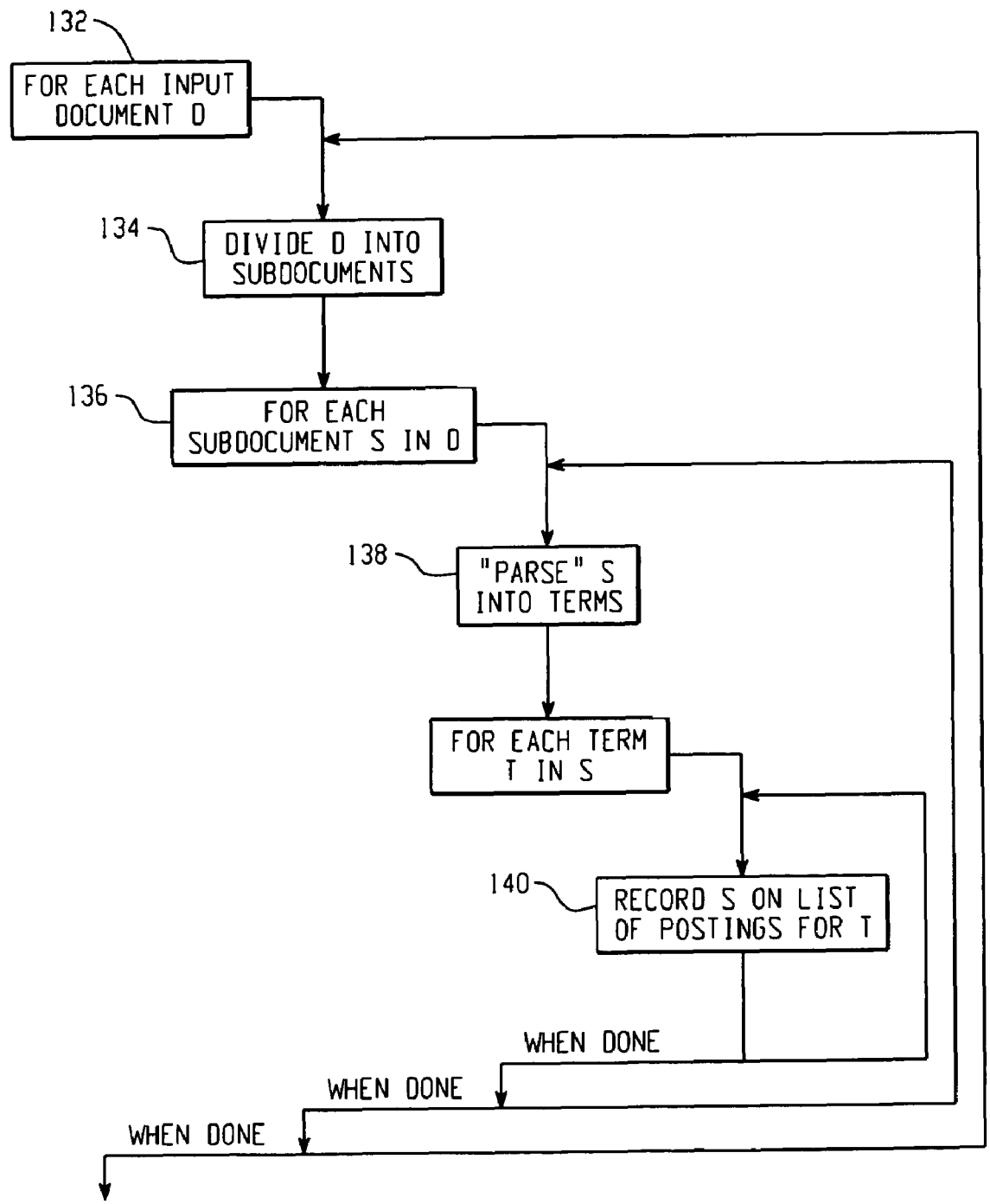
FIG. 5 is a flowchart that illustrates a process for inverting a database according to one embodiment of the present invention.

In addition to associating various resources with a selected database, various types of selected databases are automatically processed to extract specific resources. For example, a free text database may be automatically processed to create a term list having corresponding document identifiers in which the terms appear. This type of processing is implemented, for example, when database 212 is selected. FIG. 5 illustrates the process used in creating the resources associated with database 212.

The first step in the process of FIG. 5 is to select a document (or data unit 132) which is then optionally divided 134 into subdocuments. The subdocuments are used to normalize the size of text units over which scores are calculated (described below). In general, subdocuments are created by making each paragraph (or natural break created, for example, by punctuation or file characteristic) in a document (or data unit) into a subdocument with its own identifying number. Long paragraphs may be divided into multiple subdocuments and multiple short paragraphs may be combined into a single subdocument. The subdocuments will all have approximately the same length.

Once the subdocuments have been created, they are parsed in steps 136 and 138. The parsing process may be as simple as merely listing each word (or file characteristic) in the subdocument. Here, however, the subdocuments are parsed into noun phrases. This can be accomplished by a variety of techniques known in the art such as the use of lexicons, morphological analyzers or natural language grammar structures. FIG. 6 is an example listing of text that has been parsed for noun phrases. As is evident from the list on FIG. 6, the phrases tagged with a "T" are noun phrases, those tagged with a "V" are verbs, those tagged with an "X" are quantities and so on.

Once the subdocuments have been parsed, a term list containing subdocument noun phrases and the identity of the subdocuments in which the noun phrases appear is generated in step 140. All the subdocuments for each document in the database are processed according to steps 132-140. The result of this process is a term list identifying all the terms or other file characteristics (specifically, noun phrases in this example) of a database and their associated subdocument identifiers. This is the form of database 212 illustrated in FIG. 2.

Figure 4:
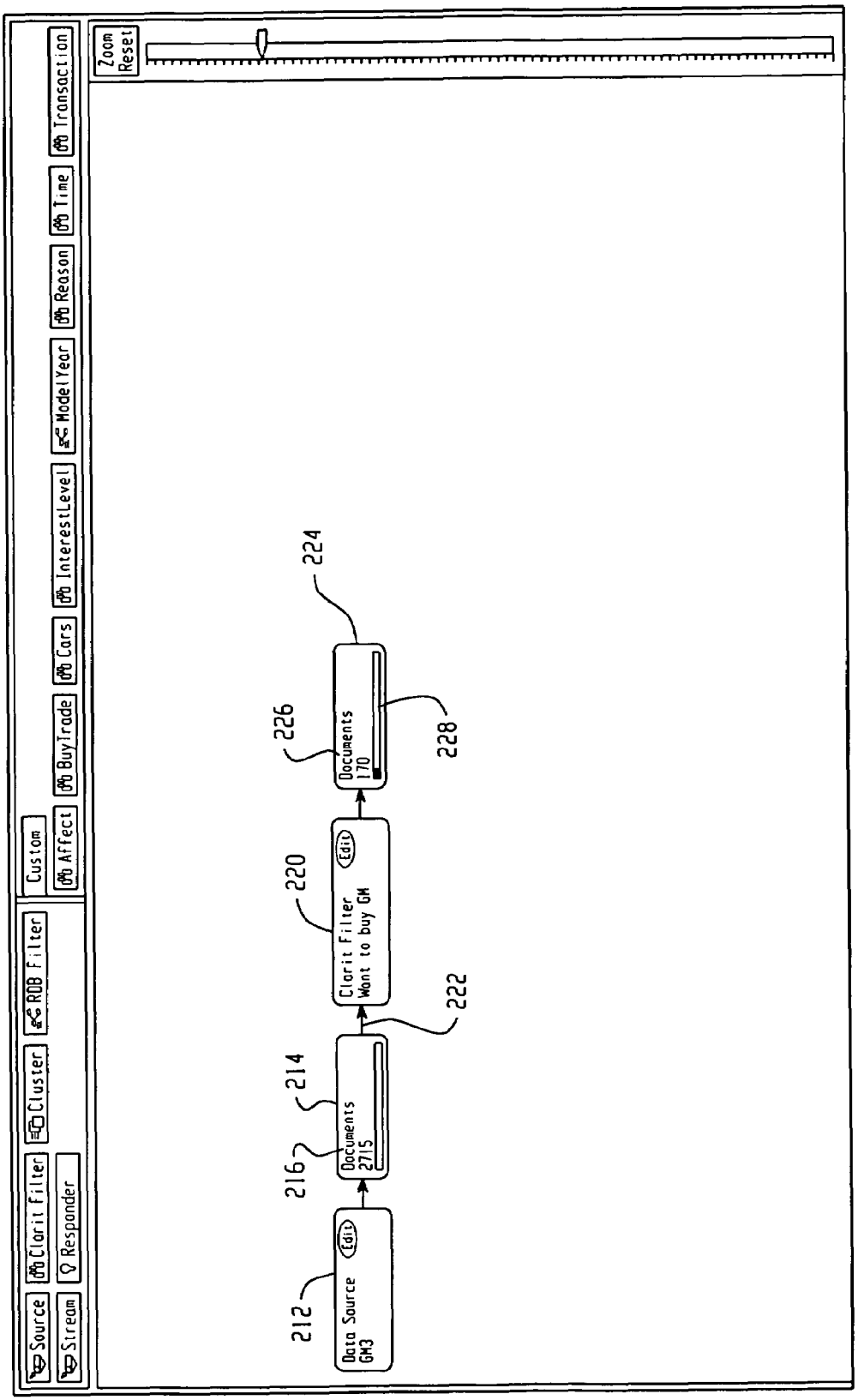
FIG. 4 illustrates an example of a structure of a partial information analysis operation constructed with a graphical user interface according to one embodiment of the present invention.

As part of the input component of the program architecture, once a data source (here database 212) has been selected, a data operator is then selected and coupled to the data source. When the data source is a database, the result of coupling the operator to the source in this GUI is to execute the operator on the data source using the analytical processing component of the program architecture. In this case, FIG. 4 illustrates that operator 220 labeled "GM" is selected and dropped onto the GUI palette. Clicking on the source 212 and the operator 220 creates an association between the two which is signified by the arrow graphic 222. As a result, the operator 220 is automatically executed on source 212 to generate an output 224. In executing the operator, all of the resources (described above) necessary to operate on the database are detected and accessed. The output of the operator is shown in a dialog box having a text description 226 of the same database characteristic 216 that is provided in dialog box 214 of the data source. The output dialog box 224 also includes a graphic 228 which illustrates the operator result obtained. Here, that graphic is a bar chart showing 170 documents selected out of the 2715 documents in the database.

Figure 7:
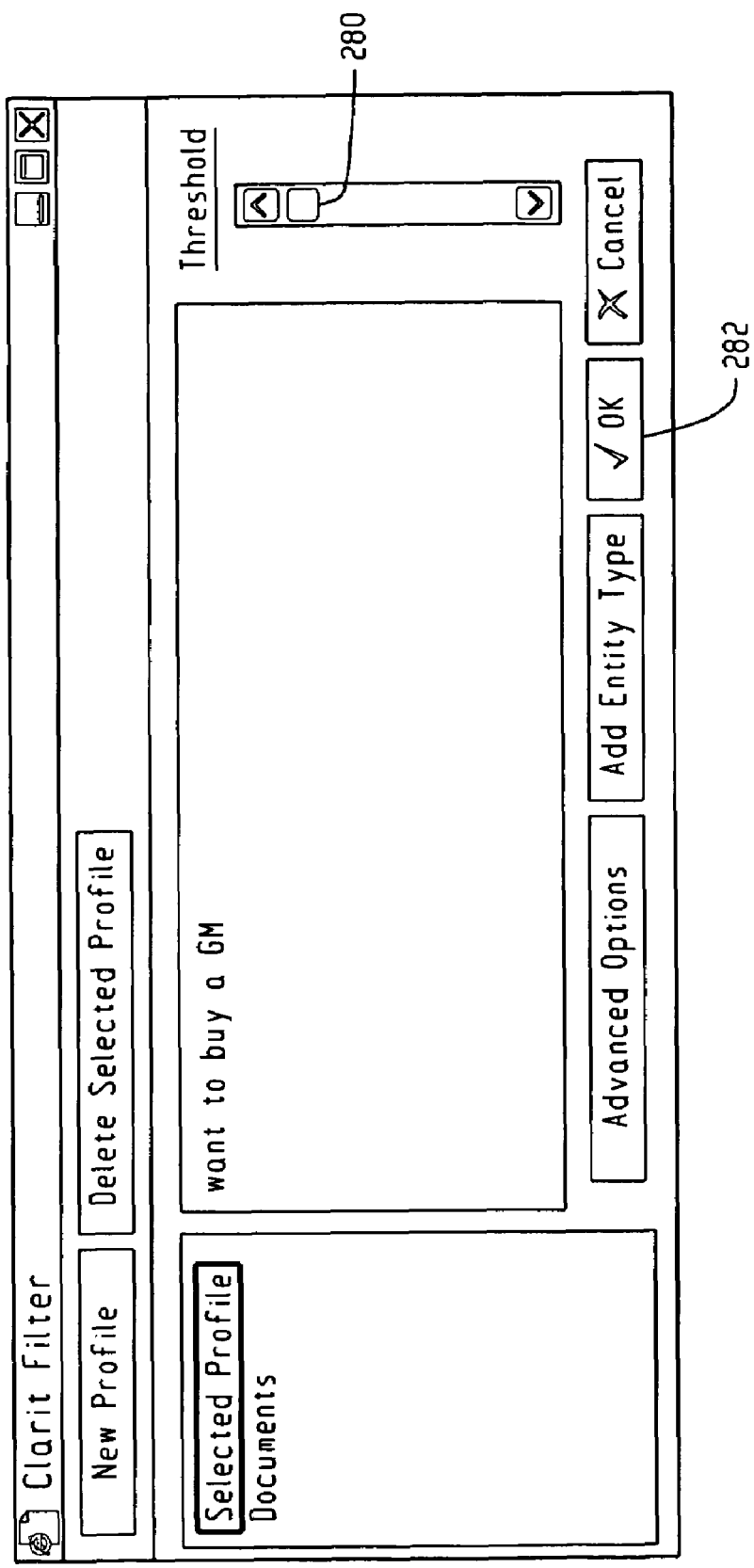
FIG. 7 illustrates a dialog box used in constructing an information analysis operation according to one embodiment of the present invention.

The operator 220 extracts information from the data source to which it is coupled. The operator 220 may also trigger a variety of functions based on the extracted information. For example, the operator 220 may be as simple as i) a logical combination of text words, ii) a function to extract entities such as places or proper names, iii) recognizing audio or video data structures, iv) recognizing pictures or graphics structures, or v) a network itself in which functions are performed based on the extraction of a particular quantity or type of information or vi) a cluster function. Here, operator 220 is a scored filter. A scored filter is created by initially generating a query such as shown in FIG. 7. FIG. 7 is a function box in which the query, or profile, such as "want to buy a GM" is typed or otherwise created. This profile is then parsed for terms using the same process as used in parsing subdocuments described above. Any arbitrary document feature may constitute a term. Once parsed, a lexicon for terms may be used to modify or expand the term list. After the term list has been generated, it is then scored against the subdocuments in the source database 212.

Figure 8:
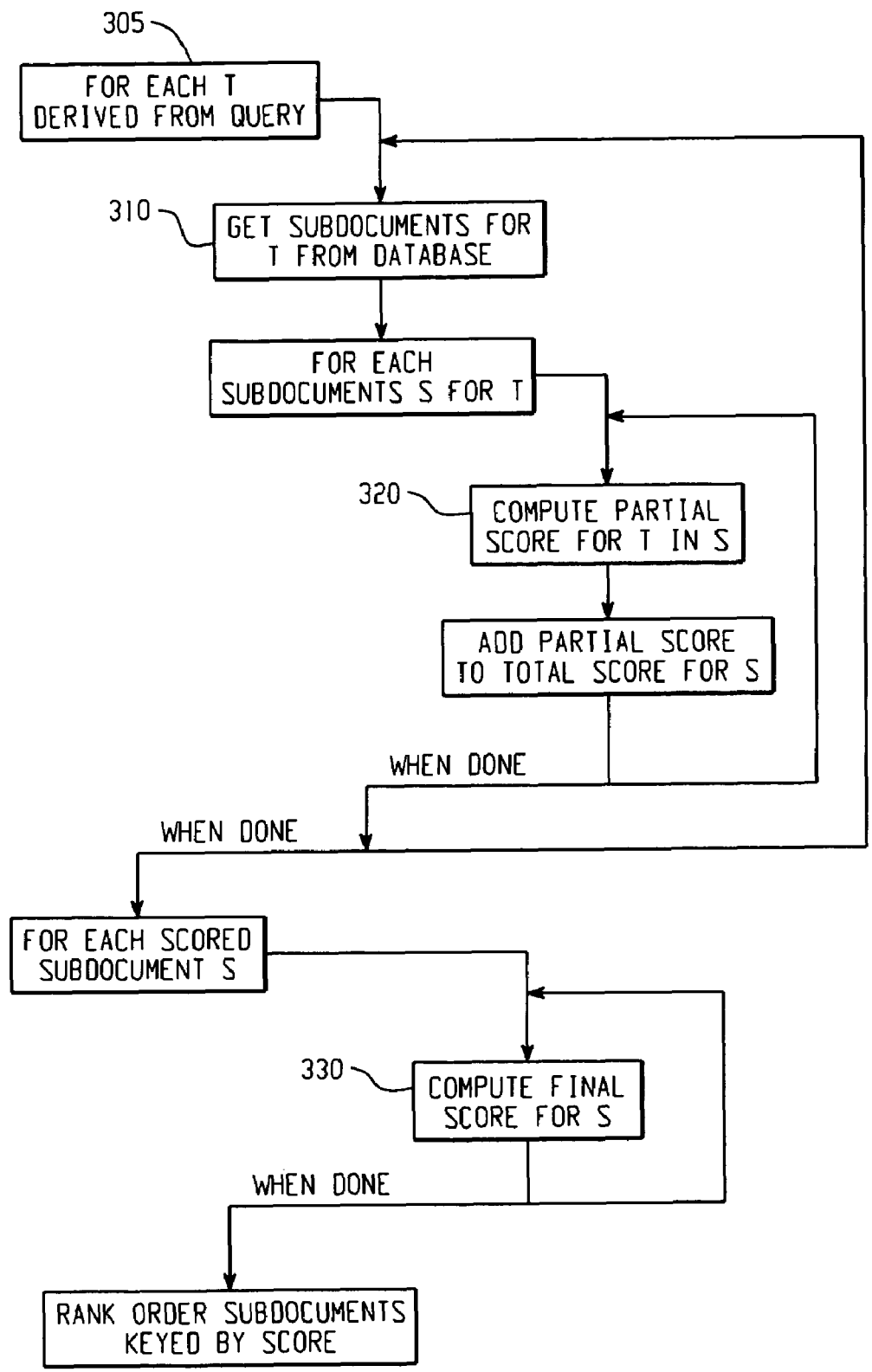
FIG. 8 is a flowchart that illustrates a process for scoring documents according to one embodiment of the present invention.

The process for scoring the subdocuments in the database is illustrated in FIG. 8. Initially, in step 305, a term is selected from the profile list. In step 310, the subdocuments in which a selected term appears are identified and they are returned from the database 212. The subdocuments are then scored against the set of terms by generating a similarity score for the term profile in step 320. Each term score represents a partial score of the profile over all of the identified subdocuments. The process of identifying and scoring continues until all terms in the profile list are exhausted. The similarity score of the profile of the database is an evaluation of the shared and disjoint features of a profile and a subdocument over an orthogonal space of T terms of the document. One such computation makes use of the following scoring algorithm:

$$S(Q_i, D_j) = \frac{Q_i \cdot D_j}{|Q| \cdot |D|} = \frac{\sum_{k=1}^{t} (q_{i_k} \cdot d_{i_k})}{\sqrt{\sum_{k=1}^{t} q_{i_k}^2} \cdot \sqrt{\sum_{k=1}^{t} d_{i_k}^2}}$$

where $Q_i$ refers to terms in the query and $D_j$ refers to terms in the document. The similarity scores for all the subdocuments are computed and summed over all the terms in the profile list. A final score for each subdocument relating to the initial profile is generated in step 330.

Once the subdocuments have been scored, they are ranked by score in step 340. Most of the scores for the subdocuments will be very low, indicating that those subdocuments have little relevance to the profile. These scores will, however, have a wide range in which the highest scoring and ranking documents will be the most relevant to the profile. The user selects a threshold between the maximum and minimum of the score range wherein documents scoring above the threshold will be returned and documents scoring below it will not be returned. The threshold is selected when the search function is created by moving the button 280 on the scale labeled "Threshold" as illustrated in FIG. 7. The threshold may be based on an absolute or relative score. The threshold adjustment can also be modified after the operator has been coupled to the data source. In an alternative embodiment, the threshold may be set automatically to a preset "default" value. In the example illustrated in FIG. 2, the initial threshold setting identified 170 documents as being relevant to the profile. Increasing the threshold setting on the filter 220 (as shown in FIG. 7) will increase the score value needed to pass the filter, thereby reducing the number of documents deemed relevant to the profile.

Figure 9:
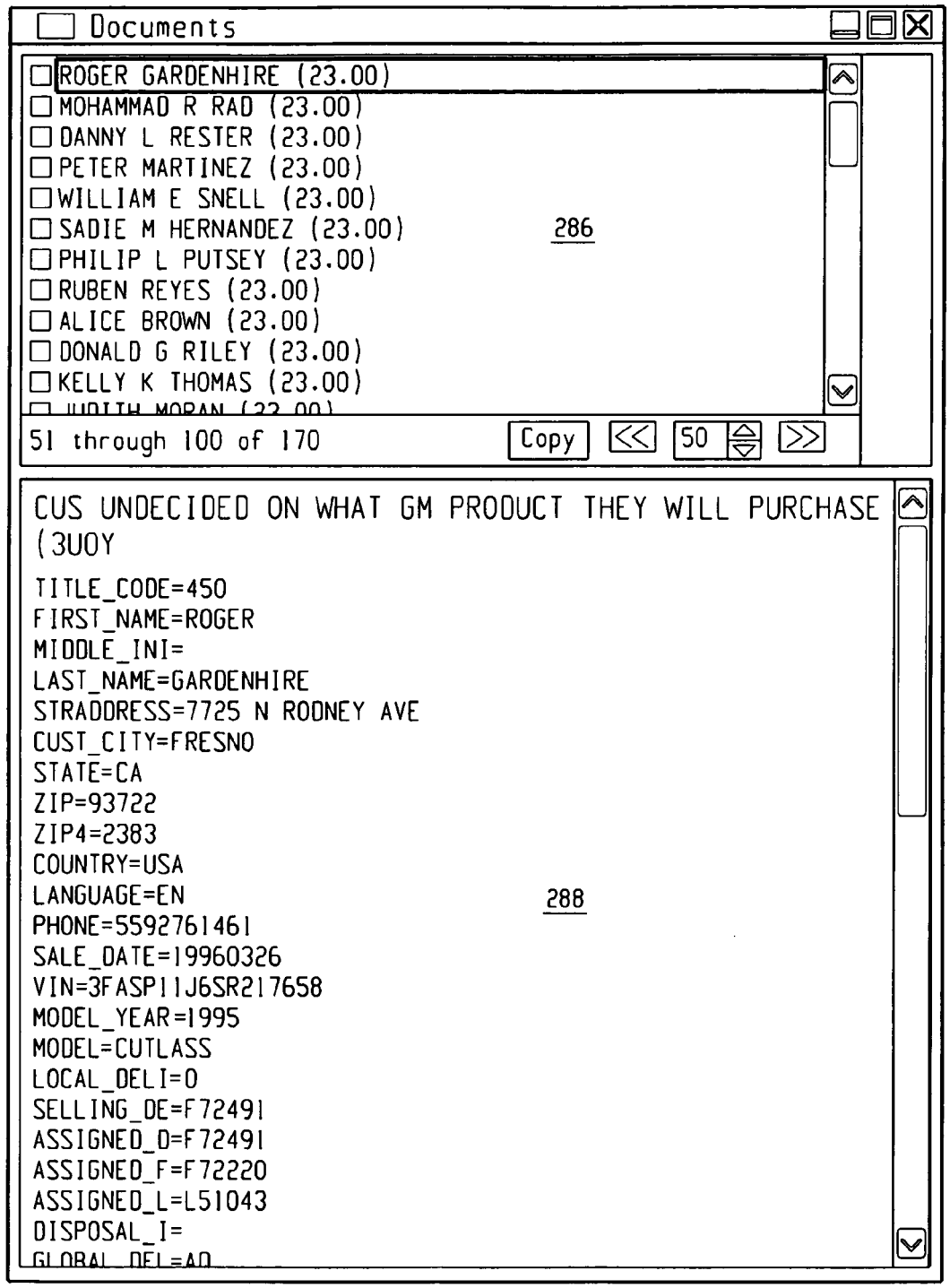
FIG. 9 illustrates a selected document from a partial list of scored documents according to one embodiment of the present invention.

After the operator has identified a number of relevant documents, it creates a list of the document numbers that identify those documents and a set of associated parameters such as the score or information from certain fields (e.g., document title). This list of document identifiers, ranked by score, is accessed by selecting the dialog box 228 and then selecting the "OK" button 282. FIG. 9 illustrates a part of the listing in box 286. Selecting any one of the listed items returns the text from the full document. This is illustrated in box 288 of FIG. 9. The fact that the document identifying number is part of the operator output enables the program to link back to the original data source to retrieve the full text. The full text is retrieved even though the operator does not carry the full text of the documents whose identifiers are returned by the operation.

The creation of the ranked list of document identifiers accessible through dialog box 228 is part of the output component of the program architecture. In addition to generating a ranked list, the output component is also capable of generating other types of output forms. One such form is a graph of term distribution. Another type of output form is a graph of term frequency across one document or across a plurality of documents in a database. Another output form is to display a document with entity types highlighted wherein differing entity types use different colors (e.g., red for names, blue for places). The use of both graphical and quantitative output forms automatically generated for each output dialog box provides rich user feedback at each operator stage to enable more sophisticated and efficient function design.

Once the output from an operator (e.g., the initial operator 220) has been generated, that output may be used to automatically trigger a variety of action or responsive operations. For example, if the number of documents returned is greater than a specific number (e.g., 100) then the score threshold used in the operator to select relevant documents may be automatically adjusted and the operator output adjusted accordingly. Also, if the number of documents returned is less than a specific number (ie., 5), then a new data source may be automatically switched in for the original data source. Further, if the number of documents returned is less than a specific number (i.e., 5), a message (such as "insufficient data") may be displayed (or transmitted over a network) to the user. Other examples of derivative operations include automatically editing the characteristics of the operator itself or automatically storing text from the retrieved documents in a separate database. Still other types of responsive operations include generating e-mails or phone messages to specific entities based on operator output. While the above list of derivative operations used in the action/response component of the program architecture is necessarily exemplary, it would be known by those of skill in the art to create a wide variety of other derivative operations.

The functional network is built up through the GUI by connecting multiple operators together. In FIG. 2 for example, operator 230 (labeled ""CUS") is executed on the output of operation 220 as indicated by the arrow graphic 232. The dialog box 234 indicates that 72 documents out of 170 have been returned from operator 230. Operator 230 can be executed on the output of operator 220 because the form of the output of operator 220 has the same structure as the data source. That is, operator 230 uses a list of document identifiers as input data just as operator 220 does (of course, while operator 220 processes all the documents in a database, operator 230 only processes those documents having listed identifiers as inputs). Because the form of operator input is the same as the form of operator output, a user can arbitrarily combine various operators in any order and the apparatus according to the present invention will process the combined function.

Operators 220 and 230 are scored type filters. However, other types of operators may be used in addition to or interchangeably with them. In FIG. 2, for example, operation 240 is an RDB type filter. It is selected from a list of RDB filters which is chosen by clicking on RDB button 236. Operation 240 is executed on the output of operation 230 as indicated by arrow graphic 238. Because the output of the previous operator (e.g., 220) incorporates a document identifier for each returned document, the full records of those identified documents are retrieved from source 212 prior to the execution of operation 240. In this case, at least some of the 72 documents identified by operation 230 have text associated with field types. One such text field is labeled "model_year". Operation 240 identifies those records having such a field type and divides them out by specific year. Here, a set of additional graphical windows (242-260) has been created for each year 1990-1999.

Another type of operator is a clustering function. In a clustering function, the documents of the database are automatically divided up into a plurality of clusters of documents wherein each cluster relates to a particular subject matter. Typically, this occurs by dividing up individual documents into one or more queries which are then evaluated against the remaining documents in the database. Accordingly, this division of the database into clusters occurs without the user specifying the topics of the database. Various techniques for performing a clustering operation are well known in the art. Here, when linked to a database source, the clustering function automatically scores subdocuments of the database against other subdocuments. In effect, each of the database subdocuments become a database query wherein the scored output of these queries is used to organize the database documents into concept clusters. Each of these clusters become output modes in the network structure. Importantly, these concept clusters are generated without the user specifying any input concerning the subject matter of the database.

Once a complete functional network has been defined by a user (and attached to a data source), the user is presented with a visualization of the network that is dynamically updated. That is, connecting the network to the data source automatically loads the network and processes the extraction function against the network wherein the results are visually displayed to the user at each node of the network. This visualization is important to understand how the extraction function operates on the data. Significantly, as the network is edited to change the interconnection between operations (or new data sources attached thereto), the network is reloaded and executed to visualize the change in results. Furthermore, because changes in the data source may change the form of the network, visualization of the changing shape of the network is important to understand the character of the information extracted by the functional network.

Moreover, once a functional network has been defined, the input component of the program architecture allows the network to be saved, stored, used as a defined function or transmitted to other users. For example, the search function illustrated on FIG. 2 (excluding the source 212) may be saved as a customer function 310 under the label "Cars". Once saved, the functional network is represented by a single user box on the GUI pallete which, when selected, expands into its full functional network configuration. The remaining buttons (312-324) on the GUI customer toolbar similarly refer to other custom functions that have been saved under their respective labels. In addition to the fact that these custom operations can be saved, they can also be transmitted to other individuals. For example, the new function "CARS" can be transmitted over a network. The recipients of the function can see the network structure in its graphical form. Those users who receive such a function (and have the GUI of the present invention) can edit it for their own use and return the edited version to the original sending party. This facilitates groups of users working with the information extraction structures.

Beyond saving individual networks, the network itself can generate its own modifications by using clustering operations to redefine any particular node. One way to perform this clustering is to simply combine the terms of the operators to form a profile associated with a node. Another way to perform the clustering is to extract the terms of the highest ranking documents and use them to form a profile for each node of the network. Each of those profiles is then evaluated against a known database to determine the highest ranking documents. The term profile for the node is then created by extracting terms from these highest ranking documents. Once a profile has been created, the threshold for accepting documents is determined. One method to set the threshold is to set it at 50% of the score of the second highest ranking document returned from the clustering process. The threshold could be determined in a variety of ways including simply setting it at some percentage of the highest expected score. Finally, a label is added to the node profile.

As part of the analytical component of the program architecture, when a network is loaded, it is compiled if possible. That is, a plurality of operators are logically combined into a single composite operator which is then treated as a query against the database. This compilation of operators compresses the logical structure of the network tree. Once the results from the tree are generated, the logic of the network tree is used to divide up the outputs to each stage of the tree. In the case of a single operator or network being connected to multiple databases, multiple databases of the same type are combined and the query executed against the combined database. Where the databases are of different types, a query is executed against each separate database, then the results are presented to the user as a combined result. Because the present invention enables multiple database inputs and because the databases are of different types, the network is recompiled when a new database is added to the network.

As noted above, the present invention is not only applicable to performing database operations but it is also applicable to performing filtering functions on data streams. A data stream is, in effect, a queue of documents that arrive over time. A data stream could consist of, for example, news stories that become available hourly over the Associated Press news service would be one type of data stream. Also, customer comments that are recorded daily would be a type of data stream. Any source of data units including but not limited to audio files, video files, pictures, graphics, text or any combination thereof which is transmitted as a function of time creates a data stream. A data stream function is simply a program, running in the background of the GUI that detects when new documents are made available to the queue from any selected source. That program then automatically receives that new document, attaches a document identifier to the new document and stores the document in the queue assigned to the stream source.

Using a data stream as the input to a functional network (instead of a database) requires a change in how the operators of the network are processed during the analytical process component of the program. Specifically, with a database source as discussed above, databases are inverted and queries (e.g., a node of a functional network) are evaluated against numerous documents in the database at one time. This evaluation process is efficient because the process operates on all the database documents at one time. If, however, this evaluation process were used on stream sources, each individual document of the data stream would need to be inverted and evaluated against all the individual queries in the functional network. This process would be very inefficient.

Accordingly, in the present invention, a fumctional network (comprising one or more operators) is automatically converted into a process optimized for filtering a data stream. Specifically, when a stream source is attached to a network, the program loads the network and senses that the input is a stream source. Then the network is compiled. However, rather than evaluating each operator of a functional network against each document as it arrives, all the profiles for each node of the network are combined and treated as if they were a database. To do this, each of the profiles is treated as a document of a database and processed accordingly. More specifically, each profile for a network node is assigned a document identifier, and the combination of all the profiles in the functional network (i.e., an operator database) is processed into an inverted database using, for example, the steps illustrated in FIG. 5. Once the database is created, the text of the incoming data unit (e.g., text document audio file or video file) from the data stream is treated as a query and evaluated against this inverted database. Those documents (queries in the functional network) scoring above the assigned threshold are identified. Identification of these documents indicates the possible routing that the input text to the stream source should take. However, because the logic of the functional network may preclude some possible routings, those precluded routings must be detected. Knowing the possible routings and the tree logic of the functional network permits the identification of the precluded routings. As a result, the program detects precluded routings and the stream source document is appropriately routed.

Figure 10:
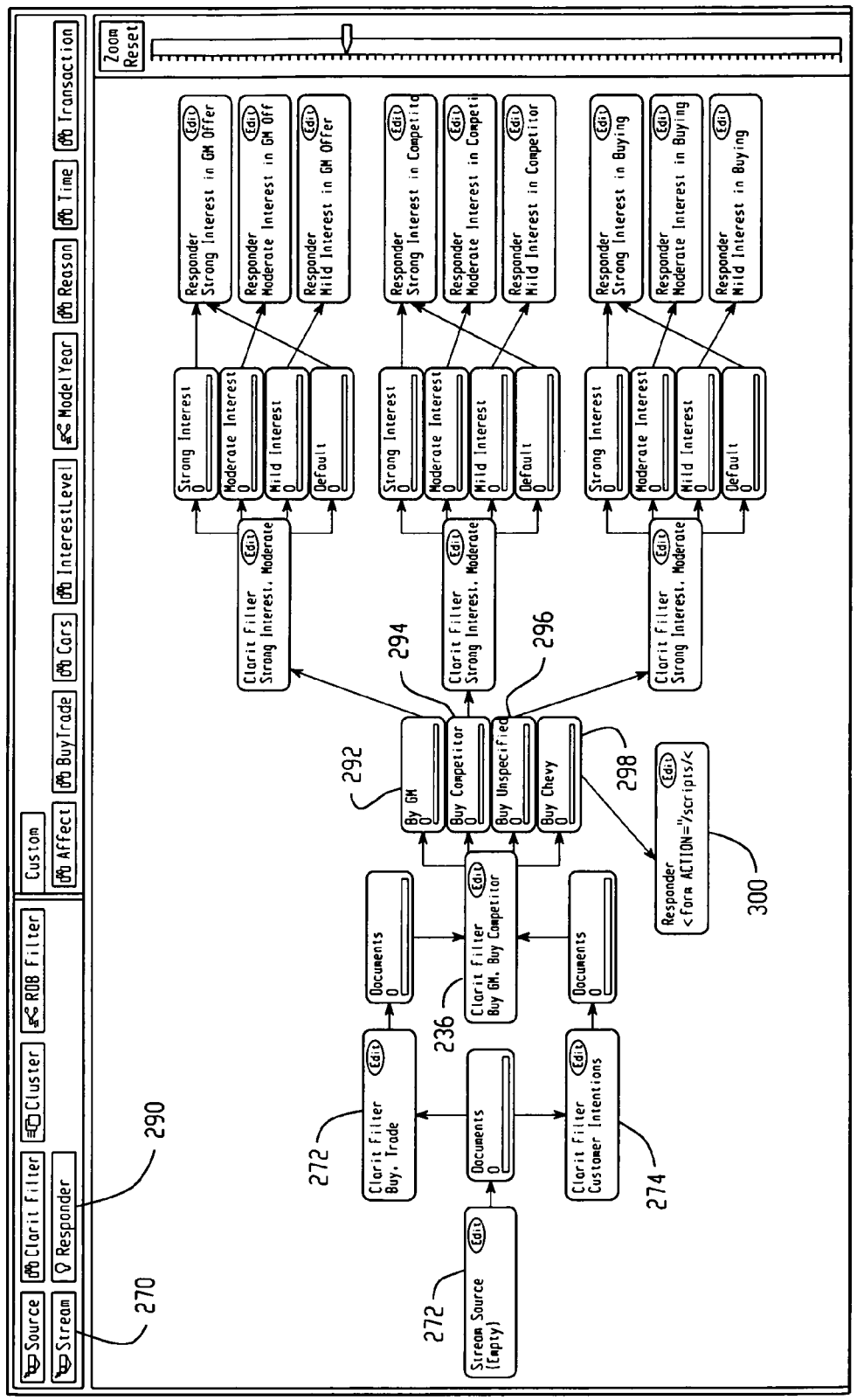
FIG. 10 illustrates an example of the structure of a complete filter operation constructed with a graphical user interface according to one embodiment of the present invention.

FIG. 10, for example, illustrates a functional network coupled to stream source 270. Here, incoming documents are automatically filtered into the respective output collections of each operator. As noted above, all the operators are collapsed into an inverted database against which queries (i.e., input text from the data stream) are scored. The logic of the network is then used to determine which routings will be used. Filtering data streams in this way is useful in a variety of applications such as customer service, electronic marketing, telemarketing, finance or any application where automated characterization of the recent records in a data stream is desired. In the filter illustrated in FIG. 10, stream source 272 (selected from a series of stream sources accessed through the stream button 270) initially has no documents. This source is coupled to a functional network, the processing of which has been described above. The GUI depicts that, as stream source text is filtered, it passes from the source through either filter 272 or 274 which selects that text relevant to "Buy; Trade" or "Customer Intentions", respectively. The output of both filters 272 and 274 is combined and passed through filter 276, which divides the responses into four categories 282, 284, 286 and 288. For three of the four categories (282, 284 and 286), the responses are further filtered according to level of interest. All responses falling into the fourth category (288) generate a "Responder" function 290, rather than being passed to another filter.

The "Responder" function is incorporated into the action/response component of the program architecture and is a call to initiate programmed functions of any kind. For example, document text may be sent by email from a customer to a car dealer. The email is the data stream source. As email is received, it is analyzed and generates specific responses. Here, the Responder function 290 is selected using the GUI button (containing a list of Responder functions) and transmits a message to all inquiries. For each document relevant to "Buy Chevy" 288, responder 290 generates a message such as "suggest GM model" and transmits that message to designated individuals. The designated individuals are defined in the responder function 290 and are linked, for example, to individuals which are identified in the incoming records such as a customer service representative who generated the incoming record. This system also is applicable to a voice mail system. That is, voice messages are the stream source and as they are received they are translated by conventional analog to digital techniques to text based messages. The text based massages are analyzed by the system which generates text based responses. Those responses are then converted into voice message form and transmitted to appropriate individuals.

The four components of the program architecture described above operate independently but cooperate to create an information mining tool with the flexibility to operate on an arbitrary combination of operators and data sources. In particular, the input component allows the user to visualize the connections between multiple operators and data sources. Because the functional network is updated as operators or data sources are connected (or disconnected) from the network, the input component provides feedback on the operation of the network that is now substantially unavailable. The input component identifies the various input and outputs of data sources and operators, and associated resources, that are to be used by the analytical component. The analytical component of the program architecture operates independently of the input component in that, from the functional network created during the input component, the process for performing operator functions are separately optimized. Specifically, the data structures, resources for operating on the selected data sources and logical structure of the functional network are compiled. From this compilation of resources, retrieval, clustering and filtering functions can all be performed on the variety of data sources. The output component, like the input component, of the program architecture also permits visualization and feedback on the functional network operation on a real time basis. Finally, the action/response component of the program architecture creates actions directly applicable to the basis for creating the functional network.

Figure 11:
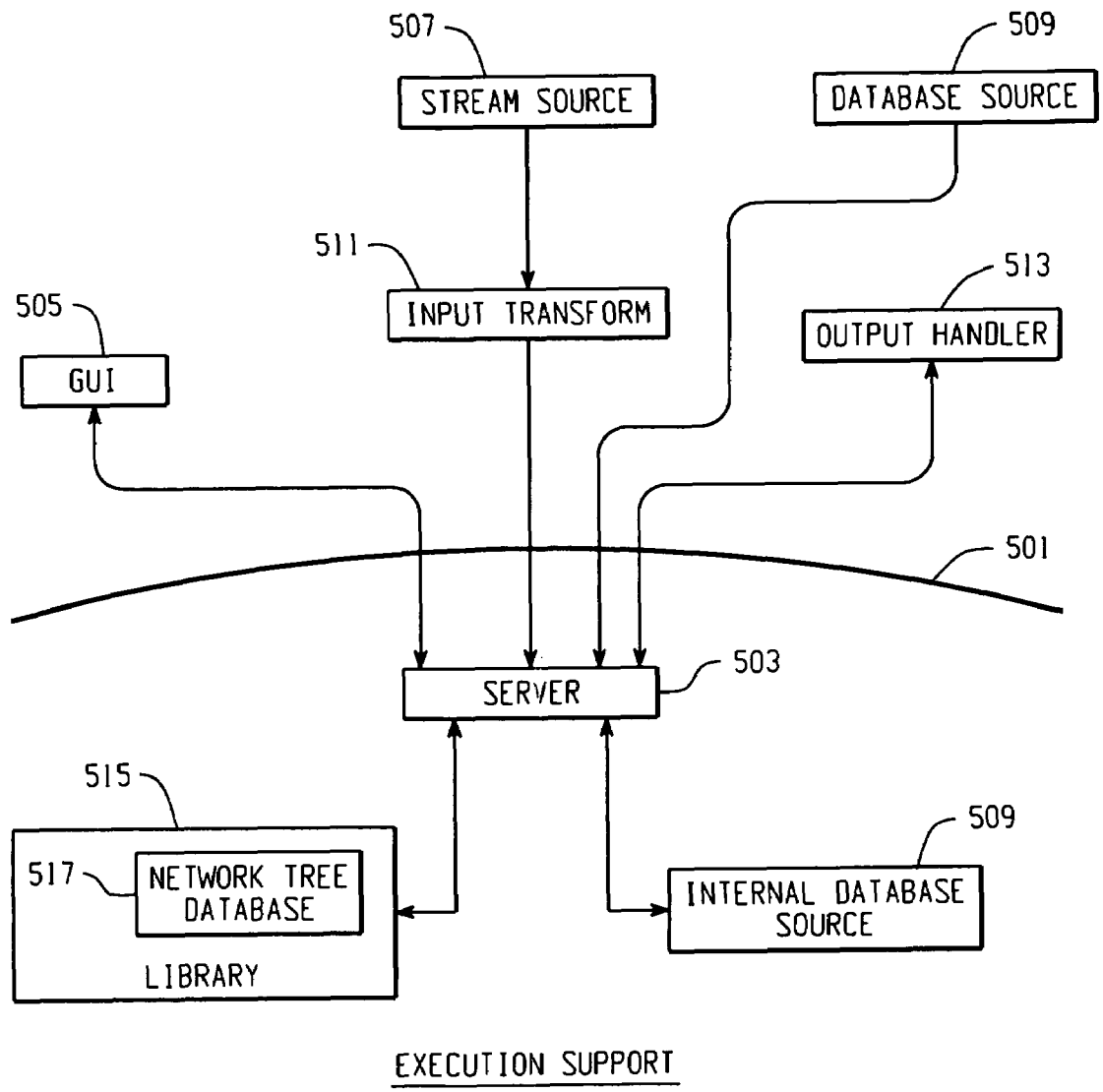
FIG. 11 illustrates the interaction of program components according to one embodiment of the present invention.

The interaction of the four components of the program architecture is illustrated in FIG. 11. The GUI 505 creates a network tree that implements data extraction function. The network tree 517 is transmitted to execution support 501 for analytical processing. The tree may be stored in a library 515. Data sources, whether internal database 509, external database 519 or stream source 507 are received through a server 503. When the source is attached to a functional network in the GUI, the network is loaded in the server 503 and compiled. The server determines the resources needed to process the network against the data source and then, after obtaining those resources, executes the network function against the source. The output of the functional network is transmitted through an output handler 513.

In this program architecture, a variety of different network trees may be stored in library 515. As a result, those trees can be shared with other network users. Additionally, because the trees are stored, data from new database sources can be processed by each tree (if applicable) as the data is received. Specifically, a library function is created in the GUI wherein when a library is attached to either a data source or an operator output, each network within the library is checked to determine if that network has inputs compatible with the desired source or operator. If so, that network is selected and the selected network is executed against the desired source or operator. As there may be many selected networks within any single library, there may be many sets of outputs and/or responder functions. The output is automatically sent to other users or otherwise stored through output handler 513. Furthermore, as data from a stream source 507 is received, it is transformed into its own inverted database (as discussed above). The server 503 then executes a compiled functional network from library 515 against the inverted database as discussed above. As a result, stream source data is automatically filtered and passed to the output handler 513.

While this invention has been particularly described and illustrated with reference to a preferred embodiment, it will be understood by one of skill in the art that changes in the above description or illustrations may be made with respect to form or detail without departing from the spirit and scope of the invention.

We claim:

1. In a computer-assisted information analysis system employing operators including search terms and filters for analyzing information from a data source, a method comprising:

generating a visual representation of a network of operators, the operators being user selectable and linked to form the network of operators, the network of operators being configured to analyze information from a selectable data source comprising at least one of a text file, an audio file, a video file, a graphic file, and a picture file, wherein each of the operators generates an output from a corresponding input received, and wherein each of the operators is directly linked to another one of the operators in the network of operators;

compiling the network of operators into a single composite operator unit to compress the logical structure of the network of operators, wherein the operators are selectable from among operators that include logical combinations of search terms, filters, functions for recognizing audio or video structures, and functions for recognizing image or graphics structures;

if the data source includes a database, applying the composite operator unit to the database, and if the data source includes a data stream, evaluating a data unit of the data stream with the composite operator unit;

generating an output indicator corresponding to each of the operators on the visual representation of the network, wherein the output indicator visually represents a quantified output of a corresponding operator; and generating a further output corresponding to one or more of the output indicators, wherein the further output comprises at least one of a ranked list of document identifiers, an indication of term distribution, an indication of term frequency, a list of document identifiers ranked by score, or a list of document identifiers with selectable links to retrieve document text.

2. A method as in claim 1, further comprising detecting whether the data source comprises a data stream or a database.

3. A method as in claim 1, wherein the output indicators indicate at least one of a number of relevant documents or document scores.

4. A method as in claim 1, wherein the indication of term distribution comprises a graph of term distribution, and wherein the indication of term frequency comprises a graph of term frequency.

5. A method as in claim 1, wherein the further output comprises an automatically generated email message, voice message, text message, or a combination thereof.

6. A computer-assisted information analysis system employing operators including search terms and filters for analyzing information from a data source, the system comprising:

a memory; and a processing system coupled to the memory, wherein the processing system is configured to:

generate a visual representation of a network of operators, the operators being user selectable and linked to form the network of operators, the network of operators being configured to analyze information from a selectable data source comprising at least one of a text file, an audio file, a video file, a graphic file, and a picture file, wherein each of the operators generates an output from a corresponding input received, and wherein each of the operators is directly linked to another one of the operators in the network of operators;

compile the network of operators into a single composite operator unit to compress the logical structure of the network of operators, wherein the operators are selectable from among operators that include logical combinations of search terms, filters, functions for recognizing audio or video structures, and functions for recognizing image or graphics structures;

if the data source includes a database, apply the composite operator unit to the database, and if the data source includes a data stream, evaluate a data unit of the data stream with the composite operator unit;

generate an output indicator corresponding to each of the operators on the visual representation of the network, wherein the output indicators visually represent a quantified output of a corresponding operator; and generate a further output corresponding to one or more of the output indicators, wherein the further output comprises at least one of a ranked list of document identifiers, an indication of term distribution, an indication of term frequency, a list of document identifiers ranked by score, or a list of document identifiers with selectable links to retrieve document text.

7. The system as in claim 6, the processing system being configured to detect whether the data source comprises a data stream or a database.

8. The system as in claim 6, wherein said filter operators comprise relational database filters, filters that generate scores, or a combination thereof.

9. The system as in claim 6, wherein the output indicators indicate at least one of a number of relevant documents, or scores associated with the operators or the data sources.

10. The system as in claim 6, wherein the further output comprises an indication of types of the documents.

11. The system as in claim 6, wherein the further output comprises an automatically generated email message, voice message, text message, or a combination thereof.

12. An article of manufacture comprising a computer readable storage medium having embodied therein computer-readable instructions for analyzing information from a data source with a processing system comprising a processor and a memory and employing operators including search terms and filters, the computer readable instructions being adapted to cause said processing system to:

generate a visual representation of a network of operators, the operators being user selectable and linked to form the network of operators, the network of operators being configured to analyze information from a selectable data source comprising at least one of a text file, an audio file, a video file, a graphic file, and a picture file, wherein each of the operators generates an output from a corresponding input received, and wherein each of the operators is directly linked to another one of the operators in the network of operators;

compile the network of operators into a single composite operator unit to compress the logical structure of the network of operators, wherein the operators are selectable from among operators that include logical combinations of search terms, filters, functions for recognizing audio or video structures, and functions for recognizing image or graphics structures;

if the data source includes a database, apply the composite operator unit to the database, and if the data source includes a data stream, evaluate a data unit of the data stream with the composite operator unit;

generate an output indicator corresponding to each of the operators on the visual representation of the network, wherein the output indicators visually represent a quantified output of a corresponding operator; and generate a further output corresponding to one or more of the output indicators, wherein the further output comprises at least one of a ranked list of document identifiers, an indication of term distribution, an indication of term frequency, a list of document identifiers ranked by score, or a list of document identifiers with selectable links to retrieve document text.

13. The article of manufacture as in claim 12, the computer readable instructions being adapted to cause the processing system to detect whether the data source comprises a data stream or a database.

14. The article of manufacture as in claim 12, wherein said filter operators comprise relational database filters, filters that generate scores, or a combination thereof.

15. The article of manufacture as in claim 12, wherein the output indicators indicate at least one of a number of relevant documents, or scores associated with the operators or the data sources.

16. The article of manufacture as in claim 12, wherein the further output comprises an indication of types of the documents.

17. The article of manufacture as in claim 12, wherein the further output comprises an automatically generated email message, voice message, text message, or a combination thereof.

* * * * *